US007873344B2

(12) United States Patent
Bowser et al.

(10) Patent No.: US 7,873,344 B2
(45) Date of Patent: Jan. 18, 2011

(54) SYSTEM AND METHOD TO DISTRIBUTE EMERGENCY INFORMATION

(75) Inventors: Robert Bowser, Copley, OH (US); David M. Theobold, Akron, OH (US)

(73) Assignee: Cisco Technology, Inc., San Jose, CA (US)

(*) Notice: Subject to any disclaimer, the term of this patent is extended or adjusted under 35 U.S.C. 154(b) by 429 days.

(21) Appl. No.: 11/242,581

(22) Filed: Oct. 3, 2005

(65) Prior Publication Data

US 2007/0207771 A1 Sep. 6, 2007

(51) Int. Cl.
*H04M 11/04* (2006.01)

(52) U.S. Cl. .................................................... 455/404.1

(58) Field of Classification Search .............. 455/404.1, 455/422, 556.1, 433, 432, 435, 436, 412, 455/413, 414.1, 414.3, 414.4, 553, 406; 340/5.2, 340/961; 701/16, 3; 705/35

See application file for complete search history.

(56) References Cited

U.S. PATENT DOCUMENTS 4,155,042 A * 5/1979 Permut et al. ................ 340/7.5
6,553,100 B1 * 4/2003 Chen et al. .................... 379/37
6,944,464 B2 * 9/2005 Muranaga ................ 455/456.1
2002/0184346 A1 * 12/2002 Mani .......................... 709/220
2004/0263314 A1 * 12/2004 Dorai et al. .................. 340/5.2
2005/0085257 A1 * 4/2005 Laird et al. .............. 455/550.1
2005/0124288 A1 * 6/2005 Karmi et al. ............... 455/3.01
2005/0202801 A1 * 9/2005 Banet et al. .............. 455/404.1
2006/0048180 A1 * 3/2006 Kendall et al. ................ 725/33
2006/0252407 A1 * 11/2006 Goldman et al. ......... 455/404.1
2007/0162365 A1 * 7/2007 Weinreb ...................... 705/35
2007/0279527 A1 * 12/2007 Dorai et al. ................. 348/552
2008/0261554 A1 * 10/2008 Keller et al. ............. 455/404.1

* cited by examiner

*Primary Examiner*—Melody Mehrpour
(74) *Attorney, Agent, or Firm*—Tucker Ellis & West LLP

(57) ABSTRACT

A system and method that enables efficient distribution of public warning information using a network infrastructure. Public warning messages are received by a wireless receiver coupled to a network. The wireless receiver broadcasts a message to users on the network responsive to receiving a public warning message.

24 Claims, 6 Drawing Sheets

SYSTEM AND METHOD TO DISTRIBUTE EMERGENCY INFORMATION

BACKGROUND OF THE INVENTION

The present invention relates generally to the distribution of emergency information over a Local Area Network (LAN). With ever increasing levels of public awareness of security threats there still remains a deficient means to distribute emergency and hazard warnings to the general public. Current emergency and hazard warning information is distributed using a combination of audible sirens and broadcast radio and/or television.

Over the past two years a new radio broadcast system was developed for the purposes of distributing emergency information ranging from Biological Hazard Warnings to Tornado Warnings. This system is called the Public Alert and employs purposely built radio receivers that display an emergency code along with an audible message. The problem with the Public Alert system is that the radio receiver may not be able to detect a signal from within a building or structure. Furthermore, it would be cumbersome, costly and unreliable for every person in an office building to own their own receiver. The basic problem is that all systems currently used to distribute emergency information that are in use today have limited effectiveness in reaching those individuals who work indoors or attend school or otherwise are unable to constantly monitor a receiver.

BRIEF SUMMARY OF THE INVENTION

In accordance with an aspect of the present invention, emergency information received on a broadcast system, such as the Public Alert system, is broadcast over a Local Area Network (LAN). Any suitable means, such as Voice over Internet Protocol (VoIP) or VoIP like protocols can be used to distribute the information to a group of users connected to the LAN. An aspect of the present invention is that a reliable network segment within a building, campus, or any desired geographical area can be used to distribute information that may not otherwise be received through currently deployed systems utilizing sirens and public radio broadcasts.

In accordance with an aspect of the present invention, there is disclosed herein an apparatus for distributing emergency information. The apparatus comprising a wireless receiver, a network transceiver and a controller operatively coupled to the wireless receiver and network transceiver. The controller is responsive to the wireless receiver receiving a wireless broadcast of an emergency transmission to trigger a broadcast comprising a message based on the emergency transmission on the network transceiver.

In accordance with an aspect of the present invention, there is disclosed herein an apparatus for distributing emergency information. The apparatus comprises means for receiving a wireless emergency transmission, means for sending messages on a network transceiver, and means for controlling operation of the apparatus operatively coupled to the means for receiving and means for sending. The means for controlling is responsive to the means for receiving a wireless emergency transmission receiving a wireless broadcast of an emergency transmission to trigger a broadcast comprising a message based on the emergency transmission on means for sending.

In accordance with an aspect of the present invention, there is disclosed herein a system for distributing emergency information. The system comprises a wireless receiver, a computing device, and a network coupling the wireless transceiver to the computing device. The wireless transceiver is responsive to receiving a wireless broadcast of an emergency transmission to broadcast a message via the network to the computing device. The message contains data based on the emergency transmission.

In accordance with an aspect of the present invention there is disclosed herein a method for distributing emergency information. The method comprises receiving a wireless emergency transmission and broadcasting a message responsive to the emergency transmission on a network coupled to a computing device.

Still other objects of the present invention will become readily apparent to those skilled in this art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without departing from the invention. Accordingly, the drawings and descriptions will be regarded as illustrative in nature and not as restrictive.

BRIEF DESCRIPTION OF THE SEVERAL VIEWS OF THE DRAWING

The accompanying drawings incorporated in and forming a part of the specification, illustrate several aspects of the present invention, and together with the description serve to explain the principles of the invention.

DETAILED DESCRIPTION OF INVENTION

Figure 1:
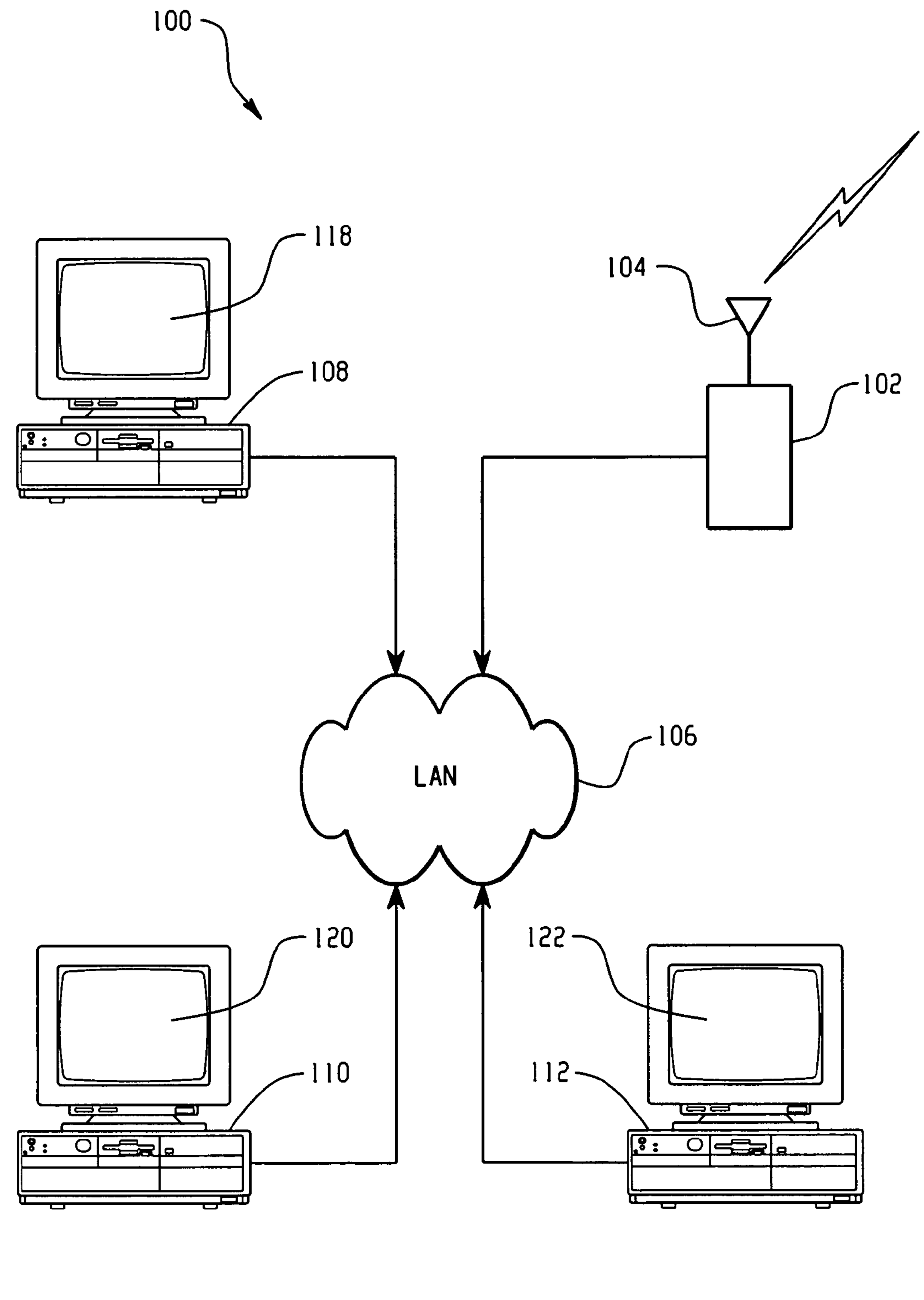
FIG. 1 is a block diagram of a network implementing an aspect of the present invention.

Throughout this description, the preferred embodiment and examples shown should be considered as exemplars, rather than limitations, of the present invention. An aspect of the present invention distributes emergency information received wirelessly, such as on the Public Alert broadcast system, over a Local Area Network. An aspect of the present invention employs VoIP (Voice over IP) like protocols to distribute emergency information to a collection of users connected to a LAN. A benefit of an aspect of the present invention is that a reliable network segment within a building or campus can be used to distribute information that may not otherwise be received through currently deployed systems of sirens and public radio broadcasts. Furthermore, relying on a WAN (Wide Area Network) connection to a central host may also be deemed unreliable due to the overall availability of a stable connection during some emergency situations.

Described herein is an apparatus for receiving a wireless emergency broadcast and transmitting a message responsive to the wireless emergency broadcast over a LAN. The broadcast message can be in the form of a broadcast message to all users of the LAN or in the form of a multicast message directed to a group of users (e.g. users belonging to a group of subscribers of a subscription service). However, the following description of this apparatus is one of many possible configurations and should not limit other similar instantiations. The apparatus is a network endpoint that consists of three ports: a network port (which may include PoE), an antenna port, and a local power port. The device receives Public Alert broadcasts, decodes the alert type header, and digitizes the accompanying audio message. This alert is then distributed over the network interface to users who are registered to receive selected alerts.

Quality of service tagging can be applied to the data payload of alert messages being sent over the network such that messages from this device are given priority over lower classes of traffic.

The apparatus could be located in the upper floors of a building or structure and a coaxial cable would connect it to an antenna placed outside of the building. The apparatus could also utilize two antennas to provide receive diversity and/or redundancy, which would also increase signal reception quality.

The Public Alert system was started by the National Oceanic and Atmospheric Administration (NOAA), National Weather Service (NWS), and the Consumer Electronics Association (CEA) in an attempt to provide a standard and reliable means to distribute emergency and warning information to the general public. The system was launched on April 2004 and provides 24 hour per day, seven days per week coverage for approximately 95% of the population of the United States and Canada. Many governmental agencies have endorsed the system as a viable method of distributing emergency information; see ("FCC: Alert System to Last Century", http://www.fcw.com/fcw/articles/2004/0823/news-fcc-08-23-04.asp).

CEA defines Public Alert as a consumer electronics product providing direct access to government emergency information 24-hours-a-day, with the ability to automatically deliver various types of audio and visual queues to users. As used herein, public alert is accorded the meaning given by the CEA unless otherwise defined. The products based on the CEA specification are sophisticated enough to recognize specific alerts for specific geographic regions, while monitoring emergency conditions at the state and national levels. All CEA-2009 certified Public Alert devices meet the CEA standard for compatibility and certification and receive free public broadcasts from NOAA Weather Radio network and Environment Canada's Meterological Service of Canada Weatheradio network.

Public Alert broadcasts are commercial free, providing on demand local 24-hour weather information in addition to alerts. Public Alert devices can be tailored to respond to alerts for any of thousands of specific areas in the U.S. and Canada. Public Alert devices can provide a variety of alert options, including lights, text messages, voice information, sirens, and/or means to activate peripheral alerting mechanisms. Public Alert devices are triggered by warnings received directly from government sources. Emergency Alert Systems (EAS) used by AM, FM and television broadcasters can experience delays in transmission. Public Alert certified devices are capable of responding to the most recent event codes proposed by the FCC in February 2002, all the codes established by the National Weather Service, and all codes being implemented by Environment Canada June 2004. Current events recognized by Public Alert Devices include, but are not limited to, 911 Outage Emergency, Avalanche Warning, Avalanche Watch, Biological Hazard Warning, Blizzard Warning, Boil Water Warning, Chemical Hazard Warning, Child Abduction Emergency, Civil Danger Warning, Civil Emergency Message, Coastal Flood Warning, Coastal Flood Watch, Contagious Disease Warning, Dam Break Warning, Dam Watch, Dust Storm Warning, Earthquake Warning, Emergency Action Notification, Emergency Action Termination, Evacuation Watch, Fire Warning, Flash Flood Watch, Flash Flood Statement, Flash Flood Warning, Flash Freeze Warning, Flood Statement, Flood Warning, Food Contamination Warning, Freeze Warning, Hazardous Materials Warning, Hurricane Statement, Hurricane Warning, Hurricane Watch, High Wind Warning, High Wind Watch, Iceberg Warning, Immediate Evacuation, Industrial Fire Warning, Land Slide Warning, Law Enforcement Warning, Local Area Emergency, Nuclear Power Plant Warning, Power Outage Advisory, Radiological Hazard Warning, Shelter In-Place Warning, Special Marine Warning, Special Weather Statement, Severe Thunderstorm Warning, Severe Thunderstorm Watch, Severe Weather Statement, Tornado Warning, Tornado Watch, Tropical Storm Warning, Tropical Storm Watch, Tsunami Warning, Tsunami Watch, Volcano Warning, Wild Fire Warning, Winter Storm Warning, and Winter Storm Watch.

Furthermore, The Department of Homeland Security has agreed to utilize the described emergency warning radio infrastructure to deploy homeland security related notifications. See http://www.dhs.gov/dhspublic/display?theme=43&content=3724.

Public Alert transmitters are localized and cover areas within a 20 to 40 mile radius. These transmissions are able to provide local alerts when phone lines or WAN are not available. For fail safe implementations of this system the apparatus described herein could receive power over its network interface using established means (such as IEEE 802.3af). The upstream switch that provides power would be configured for a redundant powering method. Network users would also be configured for UPS backed up power or laptop use with battery backup.

The apparatus can also be configured to initiate email alerts, instant messenger alerts, pager alerts and unattended intercom alerts. Local device interfaces can also enable the ability to inject local hazard information (such as fire, security threat, or other) directly into the system for distribution to clients.

As will be described herein, a computing device coupled to the network with the appropriate client application can receive the alerts sent by the apparatus. The client application runs as a service on a PC and displays the alert and associated audio message instantaneously. The network application may also be made capable of initiating power wake-up of the client's host PC. Different levels of alerts may be selected either by the individual user or as company or group policy. These alerts can be a combination of Public Alert codes, messages, interpreted or translated messages, and recommendation of action responses. Such interpretations and recommendations can be valuable for multilingual clients or building emergency response teams.

The logic that controls this apparatus would be capable of translation of warning messages to a different language. Other translations that would be possible include location specific directives or company or group specific policies for action based on the type of emergency. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software.

The logic that controls the apparatus would also allow a selected representative to issue broadcast messages to all clients. In this fashion an appointed person would have access to the system to alert users that there is an emergency condition that was detected by other means.

The apparatus could include alarm sensor inputs that would monitor the surrounding environment and would report an alert for non-normal conditions (such as temperature extremes).

The apparatus could continually monitor itself for correct operation and would send an alert to the listening client application in the event that the receiver became inoperable. Similar to virus protection software, the client application could be listening for alerts from this apparatus and could require a network administrator password to disable it. An aspect of the present invention is that it obviates the problems of relying on non-fail safe applications to distribute critical emergency information, e.g, email or instant messenger.

FIG. 1 is a block diagram of a network 100 implementing an aspect of the present invention. Network 100 includes a device (apparatus) 102 that has a wireless receiver configured to receive an emergency transmission via antenna 104. Computing devices 108, 110 and 112 are coupled device 102 via network backbone, e.g, a local area network (LAN) 106. Preferably, computing devices 108, 110, 112 have display devices 118, 120, 122 respectively for displaying data; however other output means such as audio can also be employed.

Network backbone 106 is suitably any desired network topology. For example network backbone 106 can comprise one or both of wired and wireless segments (e.g. a mesh network).

Device 102 comprises a wireless receiver configured to receive a wireless emergency broadcast signal and a transmitter configured to transmit on LAN 106. For example, the wireless receiver of device 102 can be configured to receive a Public Alert Emergency Broadcast (e.g., audio and data at 162 MHz). Device 102 is further configured to process the emergency transmission and send alert data to computing devices 108, 110, 112 via LAN 106. The alert message sent by device 102 can comprise data and digitized audio based on the received emergency transmission. The alert message can be sent by device 102 using any suitable protocol, such as for example RTP (real time protocol) and/or VoIP (Voice over Internet Protocol). The alert message can be in the form of a broadcast message to all users 108, 110, 112 of LAN 106 or in the form of a multicast message directed to a group of users (e.g. users belonging to a group of subscribers of a subscription service). In the alternative, or in addition to, device 102 can be configured to initiate email alerts, instant messenger alerts, pager alerts and unattended intercom alerts. Device 102 further comprising local device interfaces can also enable the ability to inject local hazard information (such as fire, security threat, or other) directly into the system for distribution to clients.

Device 102 can receive power via an external power connector or from network backbone 106 (e.g., Power over Ethernet "PoE", IEEE 802.3af standard). Optionally and/or alternatively, device 102 has a battery system to ensure power is provided during power interruptions.

As will be described herein (see FIG. 2), device 102 can be configured with multiple receivers. Each receiver is configured to receive a different frequency, enabling device 102 to monitor multiple frequencies simultaneously.

An aspect of the present invention is that it is suitably adapted to be a subscription service. For example, computing devices 108, 110, 112 can subscribe to receive emergency alert information from device 102. By utilizing a subscription service, computing devices 108, 110, 112 can specify a format, such as language, amount of detail, etc. for receiving the emergency alert information from device 102. In a preferred embodiment, computing devices 108, 110 112 can display an alert responsive to the broadcast sent by device 102 on display devices 118, 120, 122 respectively. Computing devices 108, 110, 112 are suitably adaptable to be configured with audio equipment. Thus, the alert can be output either visually, audibly or both by computing devices 108, 110, 112.

In a preferred embodiment, device 102 can send keep-alive or heartbeat messages enabling one or more of computing devices 108, 110, 112 to determine whether device 102 is operational and communicatively coupled. In one embodiment, a heartbeat message is sent at a predetermined interval. If a message has not been received by the time the predetermined interval expires, a warning message is displayed on one or more of display devices 118, 120, 122. In another embodiment, one or more of computing devices 108, 110, 112 sends a message (e.g. a 'ping') to device 102, and device 102 responsive to the message sends a response. If the computing device 108, 110, 112 sending the message does not receive a response within a predetermined time period, an alert can be displayed on its corresponding display device 118, 120, 122. The alert can inform a user of computing device 108, 110, 112 that communication with device 102 has been lost.

In accordance with an aspect of the present invention, system 100 includes a translation module that has logic for translating the emergency transmission from a first language to a second language. In one embodiment, the translation module is co-located with device 102. In an alternative embodiment, the translation module is co-located with one or more of computing devices 108, 110, 112.

For example, if the translation module is co-located within device 102, device 102 can send a first alert message in the first language, a second alert message in the second language, or alternatively send a single alert message comprising data in the first language and the second language. As another example, if the translation module is co-located with computing devices 108, 110, 112, device 102 sends the alert message in a first language and the translation module translates the data into a second language as appropriate. Furthermore, the second language does not have to be the same language for each computing device. For example, computing device 108 may desire to display the message in French, computing device 110 may desire to display the message in German, and computing device 112 may desire to display the message in Spanish. The translation modules co-located with computing devices 108, 110, 112 translate the alert message to the language appropriate for the computing device 108, 110, 112.

In one preferred embodiment, the alert message comprises a digital code that indicates the nature of the alert. For example, digital codes can be pre-assigned for various types of emergency transmissions. Device 102 broadcasts the appropriate digital code and logic co-located with computing devices 108, 110, 112 translate the digital code. As described herein supra, each computing device 108, 110, 112 can translate the digital code into a different language as appropriate.

In another preferred embodiment, the alert message comprises an audio component. Device 102 digitizes audio received from the emergency transmission and broadcasts the digitized audio using a protocol such as RTP. In yet another preferred embodiment, the alert message comprises a digital code and an audio component.

In accordance with an aspect of the present invention, system 100 includes a lookup table for ascertaining a policy for responding to the emergency transmission. The lookup table can be co-located with device 102. The alert message sent by device 102 further comprising the policy for responding to the emergency transmission. Alternatively, the lookup table can be co-located within computing devices 108, 110, 112, enabling individualized policies for each computing device 108, 110, 112.

Figure 2:
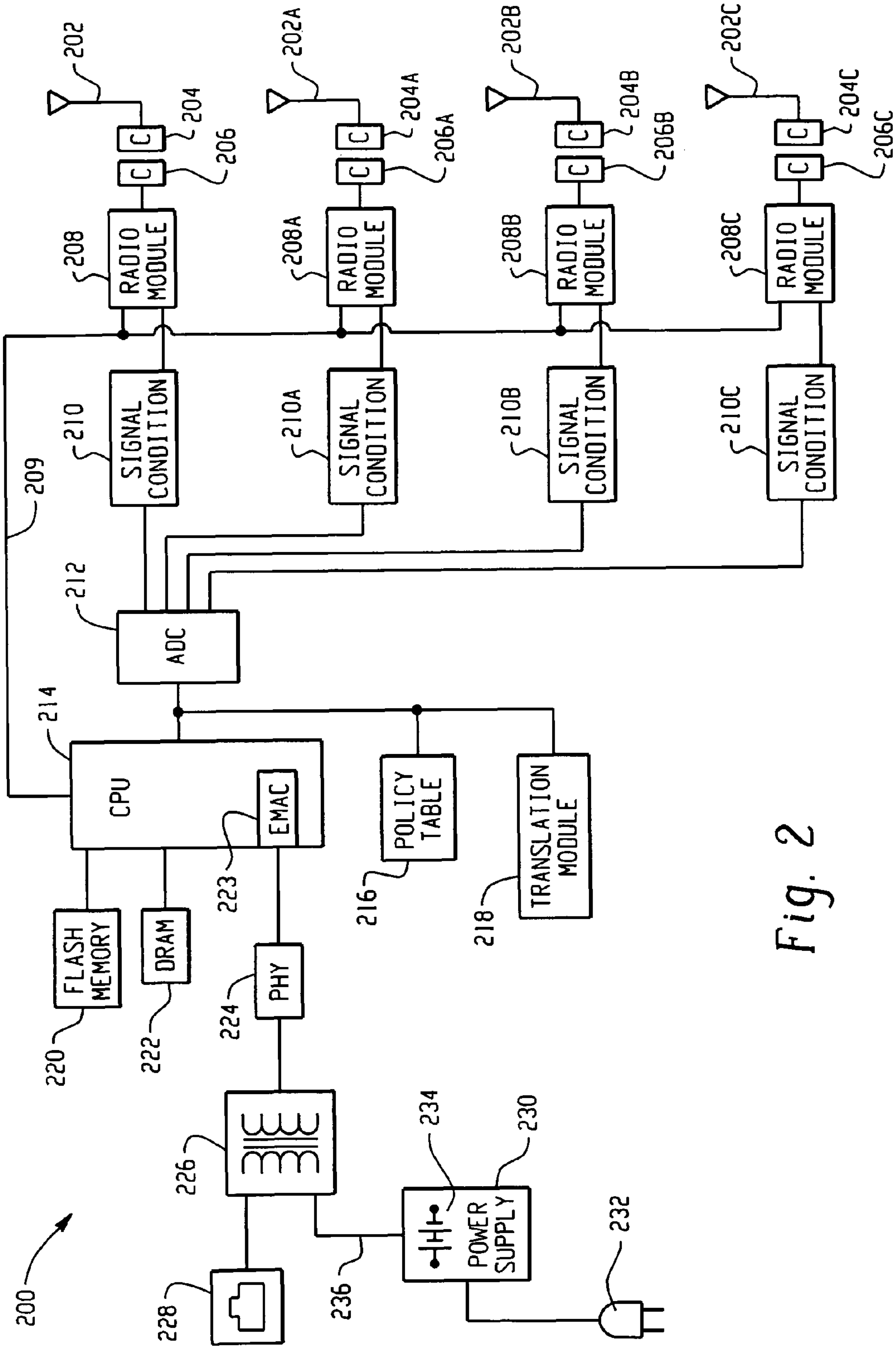
FIG. 2 is a block diagram of an apparatus for implementing an aspect of the present invention.

FIG. 2 is a block diagram of an apparatus 200 for implementing an aspect of the present invention. Apparatus 200 is suitably adapted for receiving a wireless transmission, for example an emergency transmission such as Public Alert, and broadcasting an alert responsive to receipt of an emergency transmission.

Wireless signals are received by antenna 202 coupled to radio module 208. As illustrated in FIG. 2, antenna 202 is a connectorized antenna and is coupled to radio module 208 via connectors 204, 206. Radio module 208 monitors a predetermined frequency and receives a wireless signal, such as RF, IR, Optical, etc. Radio module 208 converts signals received on the predetermined frequency to a baseband signal. The baseband signal is forwarded from radio module 208 to signal conditioner 210. A connection 209 between radio module 208 and CPU (central processing unit) 214 enables radio module 208 to alert CPU 214 when it has received a signal. Signal conditioner 210 suitably performs any additional signal conditioning such as filtering. The conditioned signal is forwarded by signal conditioner 210 to ADC (analog to digital converter) 212 where the conditioned signal is converted from an analog signal to a digital signal.

As illustrated in FIG. 2, apparatus 200 comprises several additional antennas 202A, 202B, 202C coupled via couplers 204A and 206A, 204B and 206B, and 204C and 206C respectively to radio modules 208A, 208B, 208C respectively. Radio modules 208, 208A, 208B, 208C are suitably tunable to different frequencies enabling apparatus 200 to monitor multiple frequencies. Each of radio modules 208A, 208B, 208C are coupled to connector 209 to enable them to alert CPU 214 when a signal is detected. Radio modules 208A, 208B, 208C convert a received signal to a baseband signal and have corresponding signal conditioners 210A, 210B, 210C for filtering and performing any other desired signal conditioning before forwarding the signal to ADC 212.

CPU 214 processes the signal accordingly. For example, CPU 214 can determine whether the signal is a valid emergency transmission and if so the type of emergency. CPU 214 has corresponding memories (e.g, Flash memory 220 and DRAM 222) for use by CPU 214 for temporary and semi-permanent storage, such as for storage and retrieval of memory variables and program code. When CPU completes processing the digital signal, the signal is forwarded to Ethernet Media Access Controller (EMAC) 223 for transmission on the associated network backbone (not shown, see for example network 106 in FIG. 1). EMAC 223 forwards the signal to PHY (Physical Layer controller) 224, Ethernet Magnetics 226 and Ethernet connector 228 to send the signal on the associated network.

In a preferred embodiment, CPU 214 is coupled to a policy table 216. Policy table is a lookup table wherein CPU 214 ascertains whether there exists a policy for responding to the type of emergency encoded in the digital signal. For example, for a tornado a policy can be stored that informs users on the associated network to go to the lowest level of the structure, or pre-designated areas. If a policy is found in policy table 216, the policy can be included with the message sent by CPU 214 to the associated network.

Translation module 218 has logic for translating emergency transmissions into foreign languages. For example, a signal may be received as a digital code. The translation module looks up the digital code and obtains the appropriate alert for the emergency transmission in a second language. CPU 214 has the option of sending a first signal for the alert in a first language, a second signal for the alert in a second language, or a signal that contains the alert in the first language and the second language.

Apparatus is also capable of receiving data from the associated network via connector 228, Ethernet Magnetics 226, PHY 224 and EMAC 223. CPU 214 can process the data received from the network and respond accordingly. For example, if a computing device on the associated sends a heartbeat or keep alive packet, CPU 214 responsive to receiving the packet sends a response to the device via EMAC 223, PHY 224, Ethernet Magnetics 226 and connector 228.

The received emergency transmission can either be a digital code, an audio message, or a combination of both. If the emergency transmission has a digital code, then CPU 214 can search through its memories 220, 222 for the appropriate text for the alert message. If the emergency message contained an audio component, the audio component can be digitized by ADC 212 and forwarded to the associated network by CPU 214.

Apparatus 200 suitably receives power from one or more sources. For example, power supply 230 can receive power from a standard AC adapter 232 and/or power of Ethernet received through Ethernet connector 228. Alternatively, or additionally, power supply 230 can have one or more batteries 234.

Figure 3:
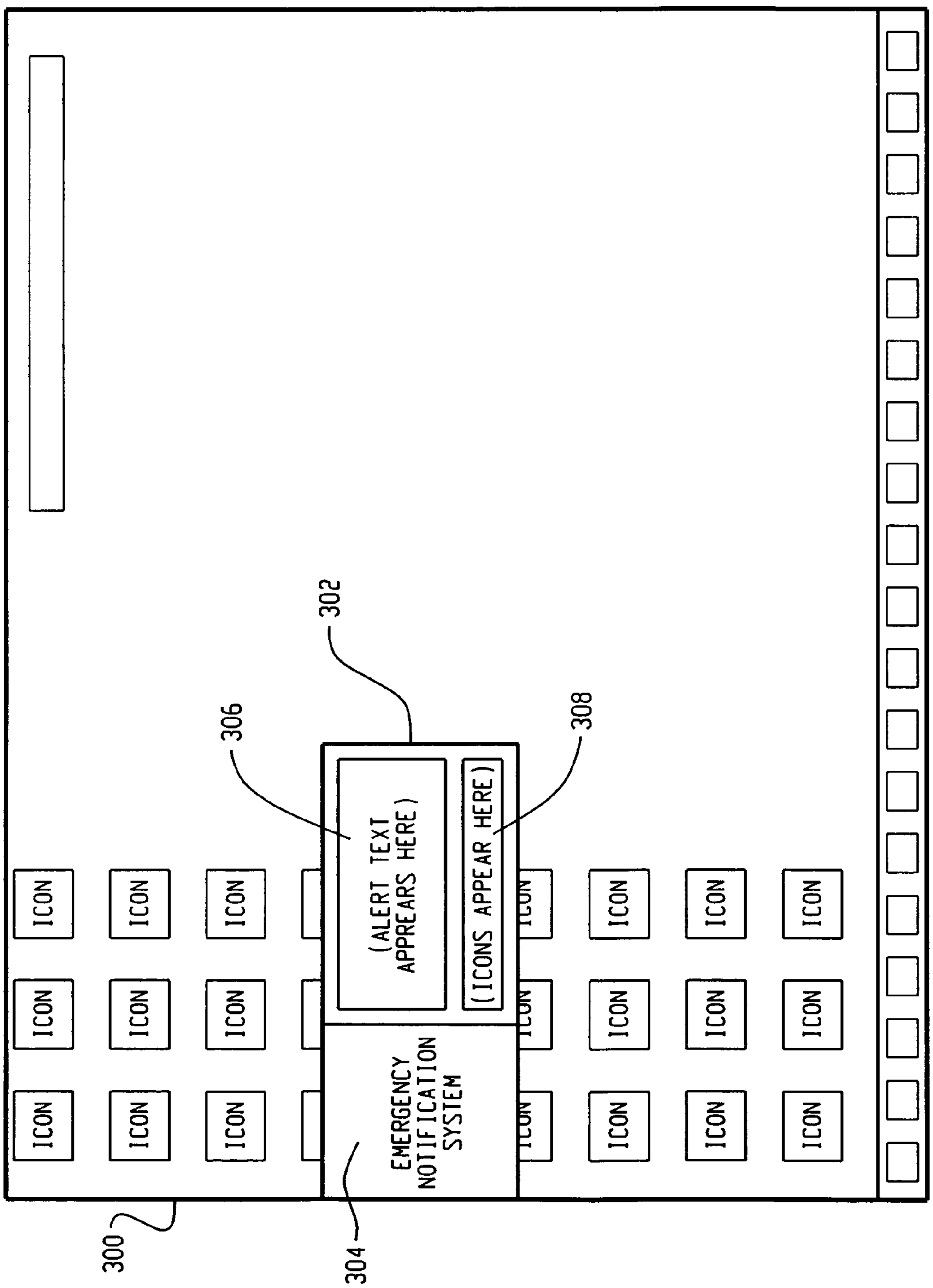
FIG. 3 is an exemplary screen snapshot of an emergency broadcast warning as received by a device on a network.

FIG. 3 is an exemplary screen snapshot 300 of an emergency broadcast warning as received by a device on a network. The emergency broadcast is displayed in window 302 on screen 300. Window 302 comprises a first portion 304 which informs a user that the window is from the emergency notification system 304. Alert text is contained in a second portion 306 of window 302. Second portion 306 would display the text indicating the type of alert, and if desired a policy for responding to the alert. A third portion 308 of window 302 can be used for displaying icons associated with the alert. For example, if an audio message accompanies the alert, an icon can be displayed that allows a user to play the audio message. Other icons can be provided for translating the text in a second or other alternative language. Still other icons can be provided to allow a user to retrieve a policy for responding to the type of alert issued.

Figure 4:
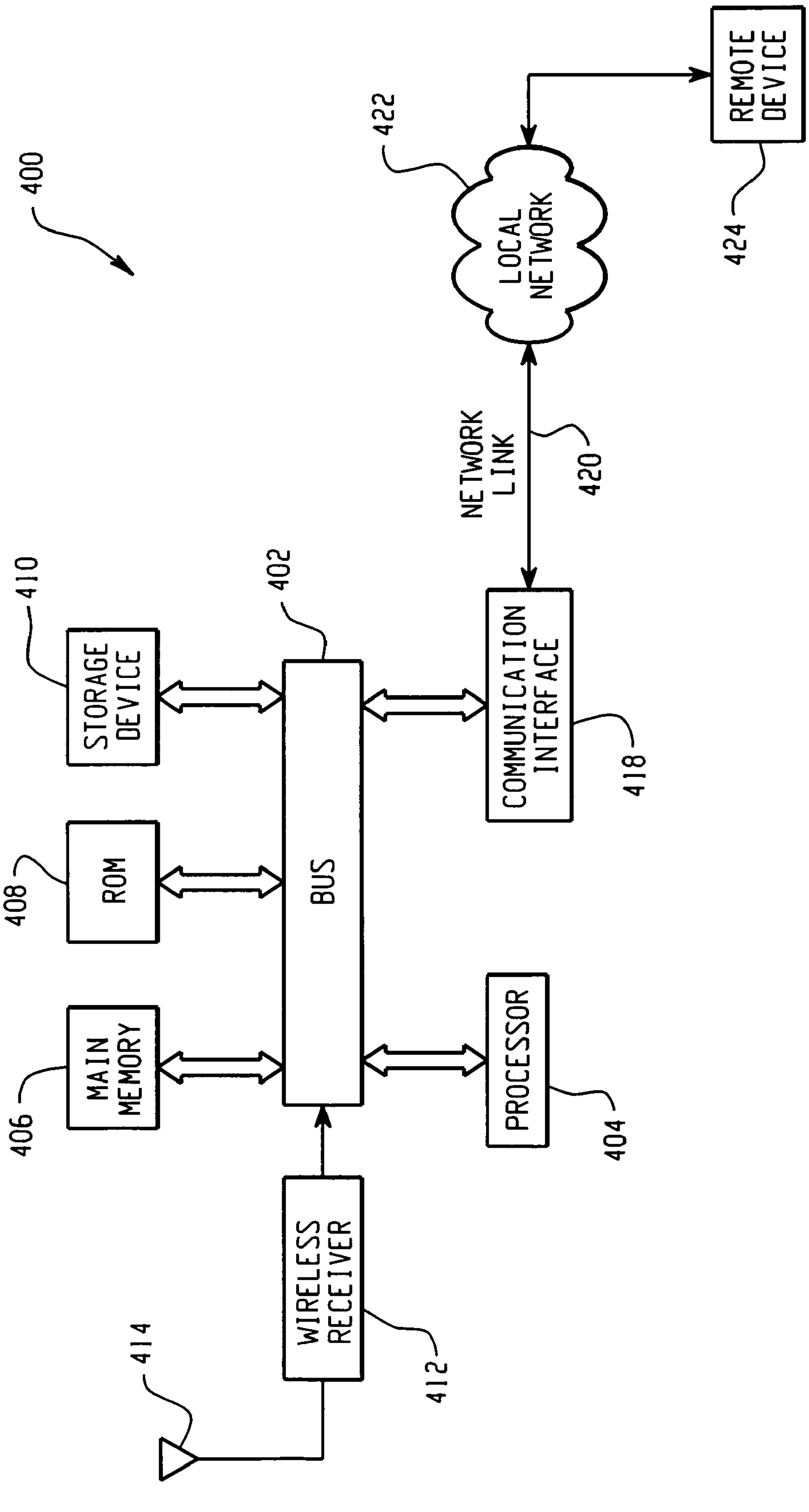
FIG. 4 is a computer system capable of implementing an aspect of the present invention.

FIG. 4 is a computer system 400 capable of implementing an aspect of the present invention. Computer system 400 is capable of functioning as a controller for device 102 (FIG. 1), computing devices 108, 110, 112 (FIG. 1) and/or apparatus 200 (FIG. 2).

Computer system 400 includes a bus 402 or other communication mechanism for communicating information and a processor 404 coupled with bus 402 for processing information. Computer system 400 also includes a main memory 406, such as random access memory (RAM) or other dynamic storage device coupled to bus 402 for storing information and instructions to be executed by processor 404. Main memory 406 also may be used for storing temporary variable or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

The invention is related to the use of computer system 100 for distributing emergency information. According to one embodiment of the invention, distributing emergency information is provided by computer system 400 in response to processor 404 executing one or more sequences of one or more instructions contained in main memory 406. Such instructions may be read into main memory 406 from another computer-readable medium, such as storage device 410. Execution of the sequence of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to non-volatile media, volatile media, and transmission media. Non-volatile media include for example optical or magnetic disks, such as storage device 410. Volatile media include dynamic memory such as main memory 406. Transmission media include coaxial cables, copper wire and fiber optics, including the wires that comprise bus 402. Transmission media can also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASHPROM, any other memory chip or cartridge, a carrier wave as described hereinafter, or any other medium from which a computer can read.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Computer system 400 is coupled to wireless receiver 412. Wireless receiver 412 receives wireless signals via antenna 414. Wireless signals may be in the form of RF, IR, optical or any other type of wireless signal. Wireless receiver performs all frequency conversion and A/D conversion and forwards a digital (and/or digitized audio) signal to bus 402 for processing by processor 404. In operation, wireless receiver 412 is tuned to a frequency reserved for emergency transmissions, such as Pubic Alert, and upon receipt of a signal, forwards the signal to processor 404 for processing.

Network link 420 typically provides data communication through one or more networks to other data devices. For example, network link 420 may provide a connection through local network 422 to a remote device 424. When processor 404 receives an emergency signal from wireless receiver 412, processor 404 sends an alert through communication interface 418 to network link 420 coupled to LAN 422 that is received by remote device 424.

Figure 5:
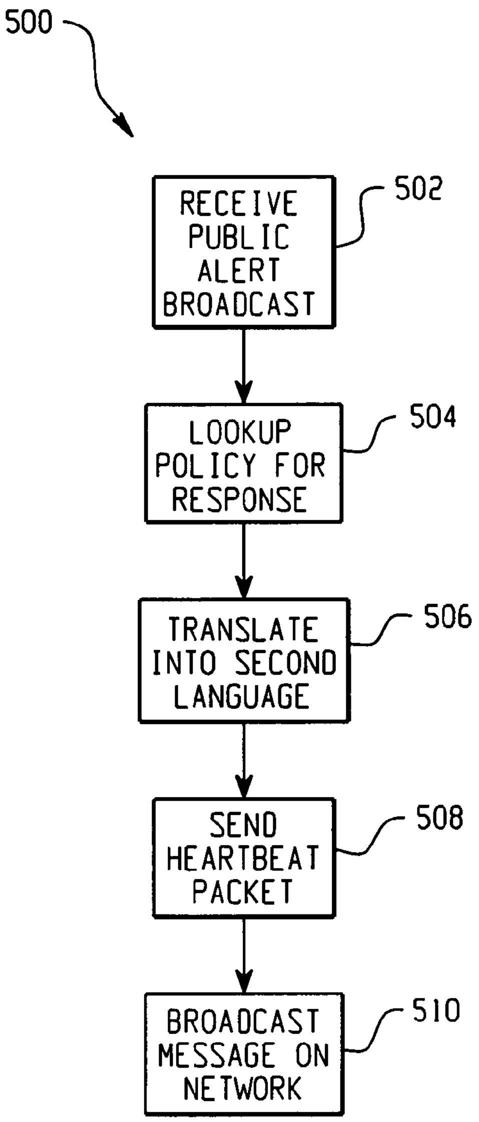
FIG. 5 is a methodology for a wireless receiver to implement an aspect of the present invention.
Figure 6:
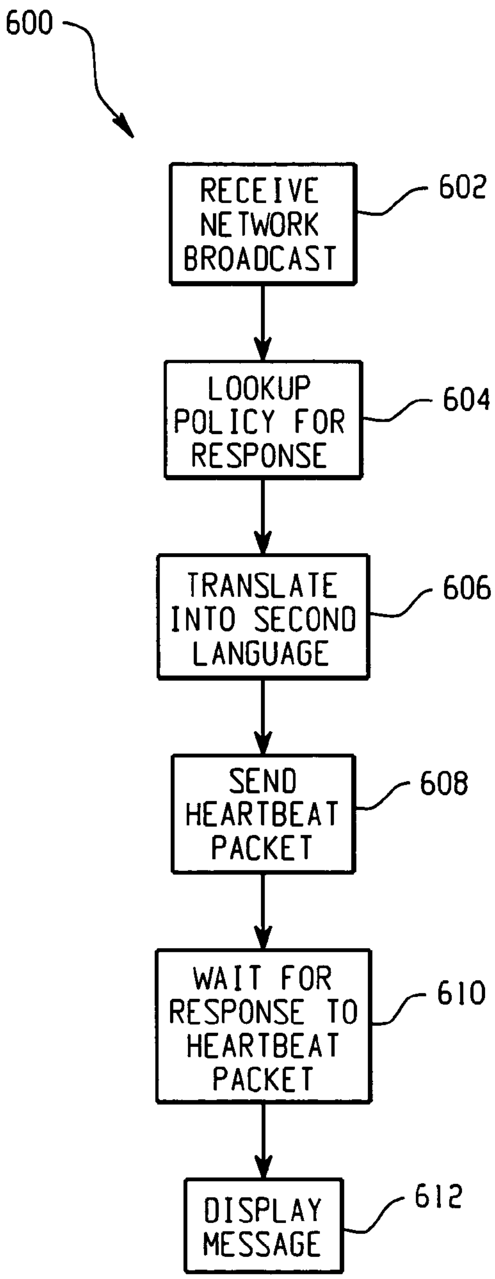
FIG. 6 is a methodology for a remote computing device to respond to an alert sent by a wireless receiver responsive to an emergency broadcast received by the wireless receiver.

In view of the foregoing structural and functional features described above, methodologies in accordance with various aspects of the present invention will be better appreciated with reference to FIGS. 5 and 6. While, for purposes of simplicity of explanation, the methodologies of FIGS. 5 and 6 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement the methodologies in accordance with an aspect the present invention. Embodiments of the present invention are suitably adapted to implement the methodology in hardware, software, or a combination thereof.

FIG. 5 is a methodology 500 for a wireless receiver to implement an aspect of the present invention. Methodology is suitably adapted for device 102 (FIG. 1), apparatus 200 (FIG. 2) and can be implemented by a computer system 400 (FIG. 4).

At 502 an emergency transmission, such as a Public Alert broadcast is received by the receiver. The emergency transmission can be in the form of a digital code or an audio message.

At 504, a policy for responding to the emergency transmission is looked up. The policy can be stored in a table local to the receiver or on another device on a network coupled to the receiver. The response can contain location specific information for responding to the type of emergency denoted in the emergency message. For a subscriber system, different responses can be stored and sent to individual subscribers.

At 506, the response is translated into a second language. For example, if the emergency transmission is in English, a translation module can be employed to translate the emergency transmission into a foreign language such as Spanish. The translated message can contain text and/or audio data, such as digitized audio.

At 508, a heartbeat (or keep-alive) packet is sent. The receiver can be configured to send the packet at a predetermined interval. Alternatively, the receiver can be configured to respond to a message sent from a remote computing device.

At 510, an alert is broadcast on a network coupled to the receiver responsive to the broadcast received at 502. The alert can comprise a digital signal denoting the type of alert and/or an audio or digitized audio signal. Furthermore, any policy or additional language translations can be sent. The alert can be a single message, or a plurality of messages. For example, an alert sent in English and Spanish can be sent as one message, sending English and Spanish text and/or audio together, or the alert can be sent as two messages, one message in English, the other in Spanish.

FIG. 6 is a methodology 600 for a remote computing device to respond to an alert sent by a wireless receiver. The computing device and wireless receiver are coupled by a network, such as a LAN.

At 602, a network broadcast is received. The network broadcast contains data indicative of the type of alert. The network broadcast can contain a digital code indicating the type of alert and/or audio, such as digitized audio.

At 604, the remote computing device looks up the policy for responding to the alert. The lookup table containing the policies for responding to alerts can be co-located with the remote computing device, or be located elsewhere on the network coupling the remote computing device to the wireless receiver.

At 606, the remote computing device translates the alert into a second language. The translation may include the policy for responding to the alert. The translation can be done locally at the remote computing device, or the computing device may obtain the translation from another device on the network.

At 608, a heartbeat packet is sent. Preferably, the heartbeat packet is sent at predetermined intervals so the remote computing device can ensure it is still able to receive alerts from the wireless device. The remote computing device waits for a response to the heartbeat packet at 610.

At 612, the alert message is displayed. The alert message can be displayed visually, audibly or both. In addition to displaying the alert, if a policy was located for the alert at 604 the policy would also be displayed. If a second, or additional, language translation was obtained for the alert, the alert can be displayed in either the second language, or the first and second language translation are displayed together.

If no alert was received, but a response to the heartbeat packet was not received, then at 612 a message would be displayed indicating that communication with the wireless device was lost. This message could also be displayed in any desired language, as well as multiple languages, and a policy for responding to the message can also be displayed.

Figure 7:
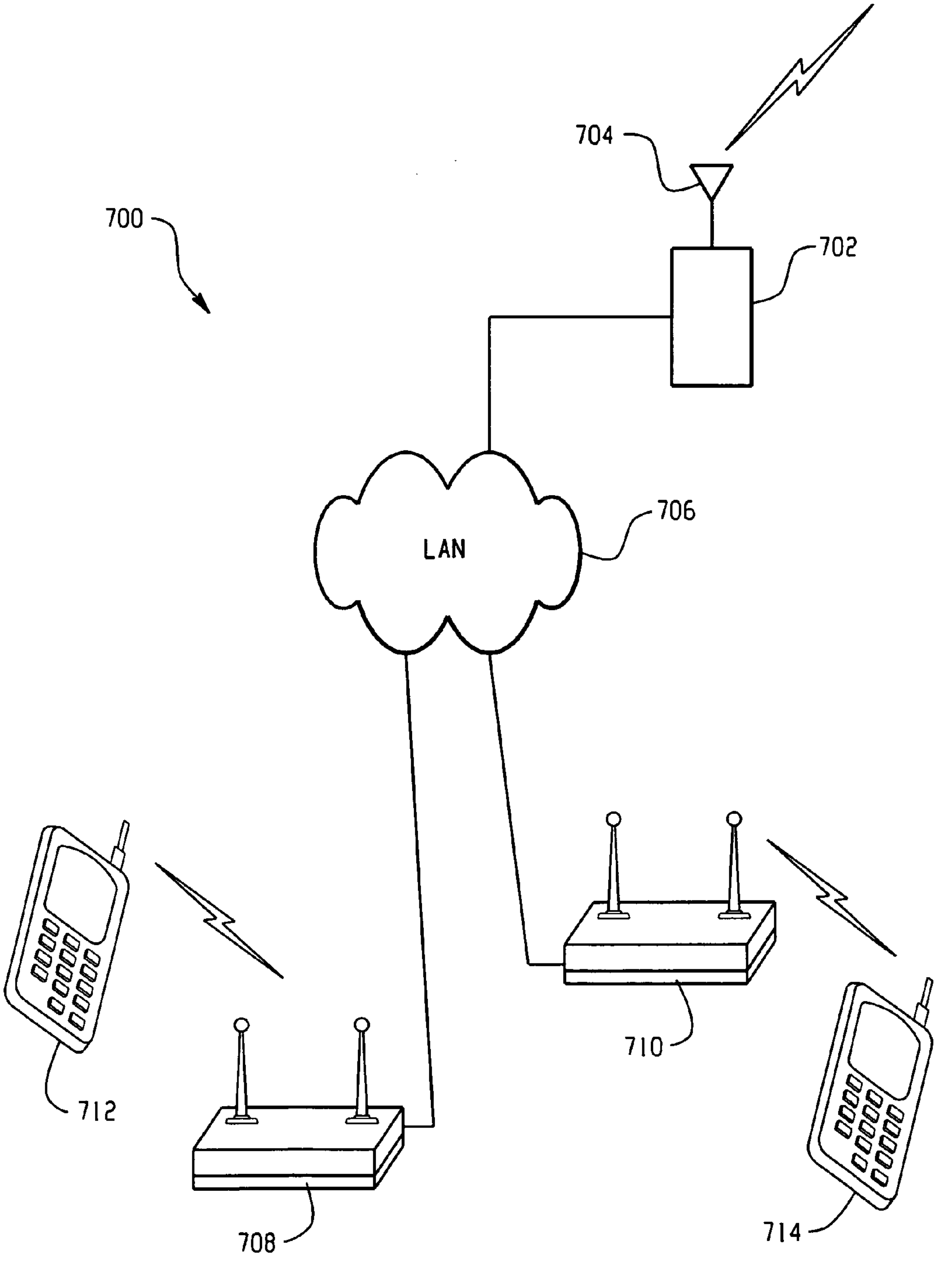
FIG. 7 is a block diagram of a wireless local area network configured in accordance with an aspect of the present invention.

FIG. 7 is a block diagram of a wireless local area network (WLAN) 700 configured in accordance with an aspect of the present invention. Wireless receiver 702 comprises a wireless receiver configured to receive a wireless emergency broadcast signal and a transmitter configured to transmit on LAN 706. Wireless receiver 702 can be configured to receive a Public Alert Emergency Broadcast (e.g., audio and data at 162 MHz or any other desired frequency). Wireless receiver 702 is further configured to process the emergency transmission and broadcast alert data on LAN 706. The alert message sent by wireless receiver 702 can comprise data and digitized audio based on the received emergency transmission. The alert message can be sent by device 702 using any suitable protocol, such as for example RTP (real time protocol) and/or similar VoIP (Voice over Internet Protocol). Wireless receiver 702 can receive power via an external power connector or from network backbone 106 (e.g., Power over Ethernet "PoE", IEEE 802.3af standard). Optionally and/or alternatively, wireless receiver 702 has a battery system to ensure power is provided during power interruptions.

As has been described herein (see FIG. 2), wireless receiver 702 can be configured with multiple receivers. Each receiver is configured to receive a different frequency, enabling wireless receiver 702 to monitor multiple frequencies simultaneously.

Wireless receiver 702 receives an emergency transmission via antenna 704. Wireless receiver 702 processes the message to determine whether it is a valid emergency message. Furthermore, wireless receiver 702 can determine whether there are predetermined policies for responding to the emergency transmission as well as whether any users on WLAN 700 require a different (second) language. The emergency transmission received by wireless receiver 702 may suitably comprise a digital code and/or an audio component. Wireless receiver 702 digitizes audio received from the emergency transmission and broadcasts the digitized audio using a protocol such as RTP.

Wireless receiver 702 broadcasts an alert on backbone network 706. Backbone network is suitably any type of wired or wireless (e.g. mesh) network, or combination thereof. The alert is received by access points (APs) 708 and 710 that are coupled to network 706. APs 708 and 710 would suitably comprise logic, such as computer system 400 (FIG. 4) that is able to process the alert, and if necessary ascertain whether there is a local policy for responding to the alert. For example, APs 708 and 710 can be located in different buildings and therefore could have different areas for users to move to in the event of an emergency. AP 708 then sends a wireless broadcast which would be received by wireless devices within its range, such as wireless device 712. Similarly, AP 710 then sends a wireless broadcast which would be received by wireless devices within its range, such as wireless device 714. Thus, end users do not have to be hardwired onto a network, such as network 706 in order to enjoy the benefits of the present invention. Alternately any location specific alert processing that could be performed by the AP could also be performed in a dedicated wireless LAN management device.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims interpreted in accordance with the breadth to which they are fairly, legally and equitably entitled.

The invention claimed is:

1. An apparatus for distributing emergency information, comprising:

a wireless receiver;

a network transceiver configured to communicate on a local area network; and a controller operatively coupled to the wireless receiver and network transceiver;

wherein the controller is configured to receive a subscription request from each of a subset of a plurality of devices in data communication with the local area network, wherein the subscription request specifies a format of an alert message;

wherein the controller is configured to receive via the wireless receiver a wireless broadcast of an emergency transmission for a specified emergency condition;

wherein the controller is configured to determine a policy for responding to the specified emergency condition responsive to receiving the wireless broadcast;

wherein the controller is configured to send an alert message addressed to each of the subset of subscribing devices coupled to the local area network via the network transceiver responsive to receiving the wireless broadcast; and wherein each alert message includes data representative of the specified emergency condition and data representative of the policy for responding to the specified emergency condition in the format specified by each of the subset of subscribing devices.

2. An apparatus according to claim 1, wherein the receiver receives multiple frequencies.

3. An apparatus according to claim 1, wherein the wireless broadcast comprises a digital code indicative of the type of alert.

4. An apparatus according to claim 3, wherein the controller determines the policy for responding to the specified emergency condition based on the digital code.

5. An apparatus according to claim 1, wherein the wireless broadcast comprises an audio component.

6. An apparatus according to claim 5, wherein the controller is configured to digitize the audio component; and wherein the alert message further comprises the digitized audio component.

7. An apparatus according to claim 1, further comprising a translation module operatively coupled to the controller, the translation module operative to translate the alert message from a first language to a second language.

8. An apparatus according to claim 7, wherein the alert message is configured in one of the group consisting of the first language, second language;

wherein the alert message is transmitted in the first language; and wherein the alert message is transmitted in the second language.

9. An apparatus according to claim 1, wherein the predefined emergency condition is selected from a group consisting of 911 Outage Emergency, Avalanche Warning, Avalanche Watch, Biological Hazard Warning, Blizzard Warning, Boil Water Warning, Chemical Hazard Warning, Child Abduction Emergency, Civil Danger Warning, Civil Emergency Message, Coastal Flood Warning, Coastal Flood Watch, Contagious Disease Warning, Dam Break Warning, Dam Watch, Dust Storm Warning, Earthquake Warning, Emergency Action Notification, Emergency Action Termination, Evacuation Watch, Fire Warning, Flash Flood Watch, Flash Flood Statement, Flash Flood Warning, Flash Freeze Warning, Flood Statement, Flood Warning, Food Contamination Warning, Freeze Warning, Hazardous Materials Warning, Hurricane Statement, Hurricane Warning, Hurricane Watch, High Wind Warning, High Wind Watch, Iceberg Warning, Immediate Evacuation, Industrial Fire Warning, Land Slide Warning, Law Enforcement Warning, Local Area Emergency, Nuclear Power Plant Warning, Power Outage Advisory, Radiological Hazard Warning, Shelter In-Place Warning, Special Marine Warning, Special Weather Statement, Severe Thunderstorm Warning, Severe Thunderstorm Watch, Severe Weather Statement, Tornado Warning, Tornado Watch, Tropical Storm Warning, Tropical Storm Watch, Tsunami Warning, Tsunami Watch, Volcano Warning, Wild Fire Warning, Winter Storm Warning, and Winter Storm Watch.

10. The apparatus according to claim 1, wherein the controller is configured to broadcast a heartbeat message to the plurality of devices via the network transceiver at a predetermined interval.

11. The apparatus according to claim 1, wherein the controller is configured to receive and respond to the heartbeat messages via the network transceiver at the predetermined intervals.

12. The apparatus according to claim 1, wherein the controller obtains the data representative of the policy from a table co-located with the controller.

13. The apparatus according to claim 1, further comprising tagging the message with a quality of service (QoS) class that gives the alert message priority over lower classes of traffic.

14. The apparatus according to claim 1, wherein the emergency broadcast is a Public Alert compliant broadcast.

15. The apparatus according to claim 1, wherein the controller is further configured send an electronic mail message, an instant message, a pager message, and an intercom alert via the network transceiver responsive to the wireless receiver receiving a wireless broadcast of an emergency transmission.

16. An apparatus for distributing emergency information, comprising:

a wireless receiver;

a network transceiver configured to communicate on a local area network;

means for receiving a subscription request from each of a subset of a plurality of devices in data communication with the local area network, wherein the subscription request specifies a format of an alert message;

means for receiving a wireless broadcast of an emergency transmission for a specified emergency condition via the wireless receiver receiving;

means for determining a policy for responding to the specified emergency condition responsive to the means for receiving; and means for sending an alert message addressed to each of the subset of subscribing devices coupled to the local area network via the network transceiver responsive to the means for receiving and means for determining;

wherein each alert message includes data representative of the specified emergency condition and data representative of the policy for responding to the specified emergency condition in the format specified by each of the subset of subscribing device.

17. A method for distributing emergency information, comprising:

receiving a subscription request from each of a subset of a plurality of devices, wherein the subscription request specifies a format of an alert message receiving a wireless emergency transmission comprising data representative of a specific type of emergency;

determining a policy for responding to the type of emergency responsive to receiving the wireless emergency transmission; and sending an alert message to each of the subset of subscribing devices;

wherein each alert message includes data representative of the type of emergency and data representative of the policy for responding to the type of emergency in the format specified by each of the subset of subscribing devices.

18. A method according to claim 17, wherein the message comprises one of the group consisting of a digital code indicative of the type of alert and an audio component.

19. A method according to claim 17 further comprising translating the emergency transmission from a first language to a second language, wherein the message is broadcast in one of the group consisting of the first language, the second language and the first language and second language.

20. A method according to claim 17, wherein the emergency transmission is a Public Alert message.

21. A method according to claim 17, further comprising communicating heartbeat messages with the plurality of devices at predetermined intervals to verify an operational coupling with the plurality of devices.

22. A method according to claim 17, wherein the message comprises an audio component, the method further comprising digitizing the audio component;

wherein the broadcast transmission further includes the digitized audio component.

23. The method according to claim 17, further comprising broadcasting the heartbeat messages to the plurality of devices via the network at the predefined intervals.

24. The method according to claim 17 further comprising:

receiving the heartbeat messages from the plurality of devices; and responding to the received heartbeat messages via the network at the predefined intervals.

* * * * *